June 19, 1928.
A. G. SHAVER
1,674,267
SPEED CONTROLLER
Filed Sept. 8, 1924
2 Sheets-Sheet 1
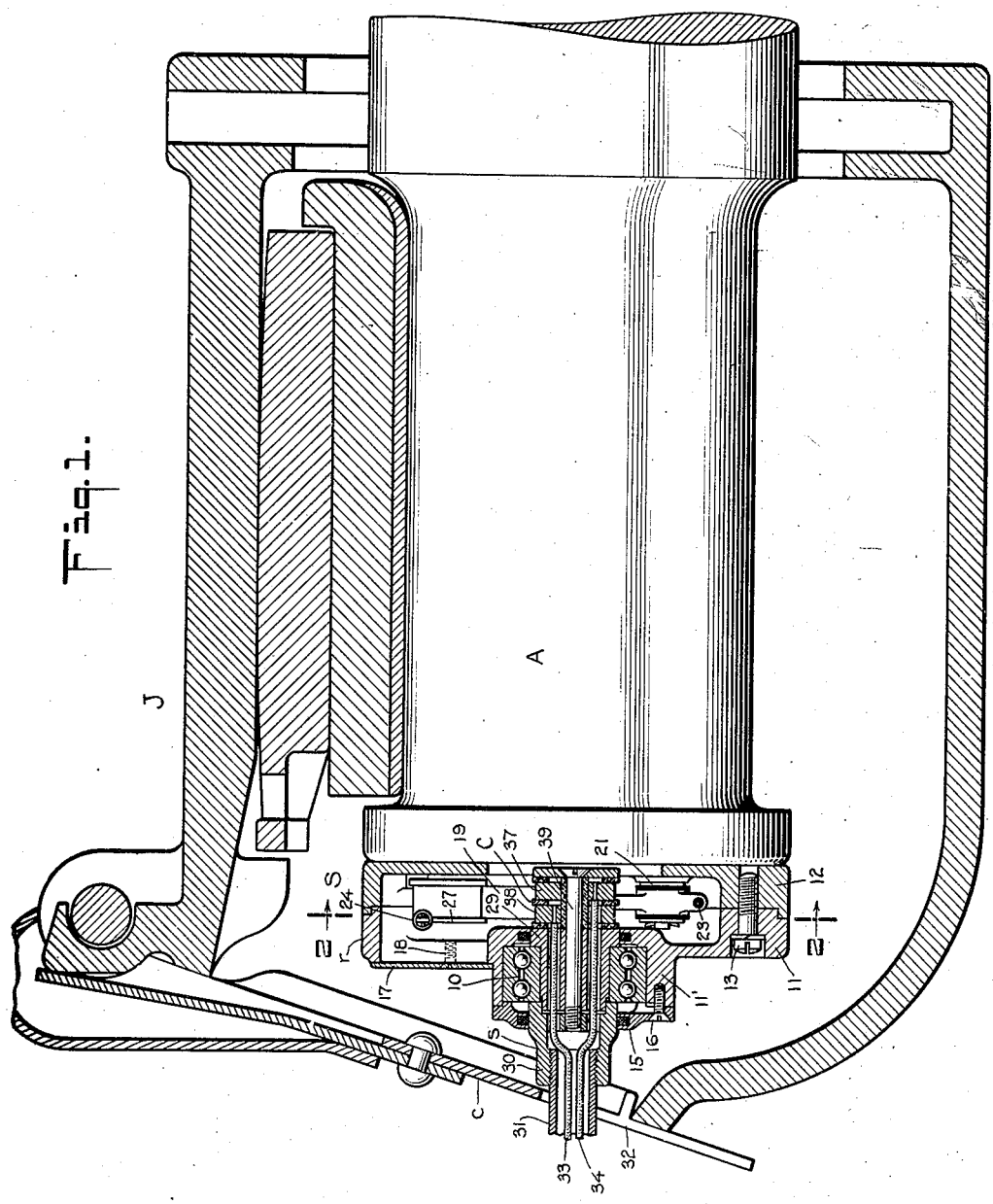
INVENTOR
Archibald G. Shaver
BY
ATTORNEYS June 19, 1928.
A. G. SHAVER
1,674,267
SPEED CONTROLLER
Filed Sept. 8, 1924
2 Sheets-Sheet 2
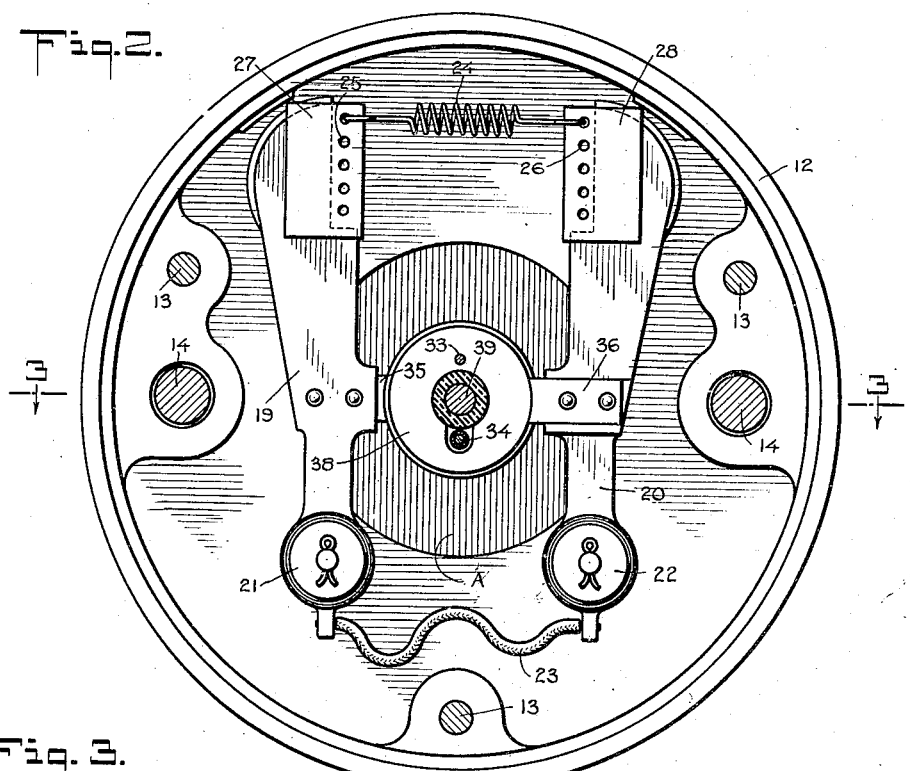
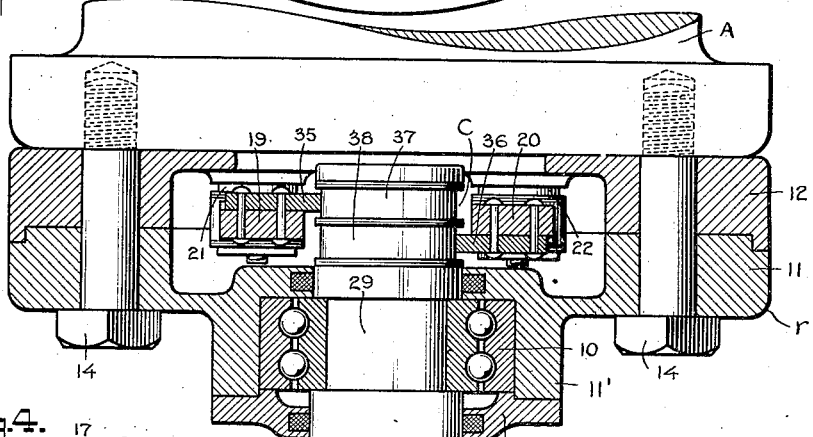
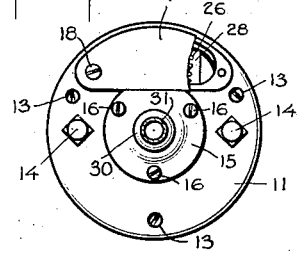
INVENTOR
Archibald G. Shaver
BY
ATTORNEYS Patented June 19, 1928.

1,674,267

UNITED STATES PATENT OFFICE.

ARCHIBALD G. SHAVER, OF CHICAGO, ILLINOIS, ASSIGNOR TO THE REGAN SAFETY DEVICES COMPANY, INC., OF NEW YORK, N. Y., A CORPORATION OF NEW YORK.

SPEED CONTROLLER.

Application filed September 8, 1924. Serial No. 736,518.

This invention relates to vehicle carried mechanism for automatic train control systems, and has special reference to the provision of an improved speed responsive mechanism or speed controller for train control systems.

As is disclosed and claimed in my copending application to speed controller, now Patent No. 1,510,803, dated Oct. 7, 1924, it has been demonstrated that for obtaining efficient and reliable operation of the train control system, it is highly desirable to directly connect the speed controller of the system to the wheel or axle of the vehicle and carried thereby, the construction being such that the speed controller elements are directly driven from the running gear, the construction permitting the arrangement of the elements in a compact manner and the efficient housing of the same. The direct mounting and operation of the speed controller is accomplished in the preferred manner by connecting or attaching a movable or rotor element directly to a wheel of the vehicle or to the outer end of the axle of the wheel so as to be supported by and for rotation with the axle, and by mounting a relatively stationary or stator element in a position for cooperation with the rotor element, the cooperation between the two being designed for operating and controlling vehicle carried circuits.

A prime object of my present invention comprehends the provision of a speed controller having the general construction and assembly disclosed in said copending application combined with the journal box and axle of the vehicle, the combination including the housing of the speed controller by the journal box and the direct connection and mounting of the speed controller to and on the vehicle axle in the journal box.

For the accomplishment of the foregoing and such other objects as will hereinafter appear, my invention consists in the elements and their relation one to the other, as hereinafter particularly described and sought to be defined in the claims; reference being had to the accompanying drawings which show a preferred embodiment of my invention, and in which:

Fig. 1 is a cross-sectional view of the journal box speed controller of my invention, Fig. 2 is an enlarged view of the speed controller taken in cross-section on the line 2—2, Fig. 1, Fig. 3 is a view taken in cross-section on the line 3—3, Fig. 2, and Fig. 4 is a front face view of the speed controller shown on a reduced scale.

Referring now more in detail to the drawings, and having reference first to Fig. 1 thereof, the invention in one of its generic aspects comprises the provision of a speed responsive mechanism or speed controller S connected directly to the axle A of a vehicle so as to be carried thereby, the speed controller S having parts preferably directly affixed to the front end of the axle so as to be rotatable therewith, as described more in detail hereinafter, the said speed controller being constructed and designed so as to be housed by the journal box J and located between the axle A and the journal box closure c.

The speed controller S comprises in the preferred construction a rotor section r which is affixed to the axle A and a stator section s which is adapted to be held stationary during the rotation of the axle and the rotor section r, and a circuit controlling means generally designated as C influenced and operated by the relative rotation of the rotor and stator sections.

The speed controller rotor section r comprises a casing having the mating casing parts 11 and 12 secured together by means of a plurality of bolts 13, the casing parts being affixed or attached to the end face of the axle A by means of the plurality of securing bolts 14, 14. The casing section 12 carries the speed responsive elements, as will be described presently, and the casing section 11 is provided with a central boss portion 11' localized substantially at the axis of the speed controller structure and which forms a seat and housing for the antifrictional or ball bearing means 10, the said boss portion 11' being provided with an end cap 15 secured thereto by means of the securing screws 16. For permitting quick inspection of the interior of the rotor casing r without disassembling the parts, the casing section 11 is further provided with a removable closure element 17 fixed to the casing section 11 by securing elements 18. The rotor r and parts attached thereto form a casing which is rotatable with the axle A, in which casing the seed responsive elements and parts operated thereby are protectively housed.

The preferred form of speed controller, as shown in the drawings, is of the centrifugal type, a pair of centrifugally operated arms 19 and 20 being provided, which arms are insulatably mounted on the pivot posts 21 and 22 formed integrally with the casing section 12, the said centrifugally operated arms being electrically connected together by means of the conductor 23 and a coil spring 24, the opposite ends of which are looped for reception by any of the plurality of series of apertures 25 and 26 provided respectively in plates 27 and 28 which are fixed to the ends of the centrifugal arms 19 and 20, adjustment of the spring 24 in the sets of apertures 25 and 26 being effective for adjustably predetermining the speed at which the centrifugal arms will move outwardly from their normal positions.

The stator section s is axially aligned with the rotor section r and the axle A, and comprises a flanged tubular member 29 and the member 30, both of which are fixed to the stator portion of the ball bearing 10, the said member 30 threadedly receiving a conduit 31, which conduit extends through a cut-out portion or slit 32 provided in the journal box closure c, the conduit housing conductors such as 33 and 34, which conductors are connected to the circuit controlling mechanism C heretofore mentioned. It will be noted that the stator section is substantially localized at the axis of the speed controller structure and that the said stator section is mounted on and within the exterior wall 17 of the rotor section, the mounting being such as to permit rotation of the rotor section at high speeds without producing any tendency to a rotative torque on the stator section. By means of this construction, therefore, the speed controller of my invention may be operated efficiently even after long periods of service with the high speeds commonly met with in railroad practice.

The circuit controlling mechanism C comprises cooperative elements carried respectively by the stator and rotor sections of the speed controller, and includes a pair of contact brushes 35 and 36 carried respectively by the centrifugal arms 19 and 20, and a pair of contact rings 37 and 38 fixedly and insulatably carried by the stator section s and cooperating respectively with the contact brushes 35 and 36. The rings 37 and 38 are insulated from each other and are insulatably connected to the stator element 30 by means of the bushings and washers clearly shown in Fig. 1 of the drawings, the parts being secured together by means of the securing screw 39; and the contact rings 37 and 38 are connected to the conductors 34 and 33 respectively, which conductors are in turn arranged in automatic train controlling circuits, as is fully disclosed in my aforementioned copending application, operative for automatically controlling the speed of the train in response to roadside or traffic conditions.

The use and operation of the speed controller of my present invention and the many advantages in construction, arrangement and operation thereof will in the main be fully apparent from the above detailed description. It will be seen that the operative parts of the speed controller and circuit controlling means are protectively housed against damage, the elements and foreign matter, and the speed controller as a whole is effectively encased by the journal box structure. It will be further seen that the rotatable parts of the controller are within the journal box, the stator parts alone projecting through the journal box closure, thus eliminating all moving parts outside of the casing body of the journal box. The operative parts of the speed controller, moreover, are directly operated by the axle, eliminating all gearing therebetween, and the necessity for all mounting means for the speed controller is wholly obviated, producing not only a simplified speed controller structure, but one which is subject to little derangement, damage or mis-operation of parts even under severe service conditions. Moreover, the construction permits of a compactness of organization, so that the rotatable parts of the speed controller are substantially integral with the axle so as to be rotatable therewith as a unit.

While I have shown my invention in the preferred form, it will be understood that many changes and modifications may be made in the structure disclosed without departing from the spirit of the invention, defined in the following claims.

1. In a vehicle mechanism, the combination with an axle and journal box of the vehicle, of a speed controlled circuit controller connected to said axle and housed by the journal box, and circuit controlling contact means influenced by the operation of said controller at a predetermined speed.

2. In a vehicle mechanism, the combination with an axle and journal box of the vehicle, of a speed controlled circuit controller connected to and carried by said axle and housed by the journal box, and circuit controlling contact means influenced by the operation of said controller at a predetermined speed.

3. In a vehicle mechanism, the combination with an axle and journal box of the vehicle, of a centrifugally operated speed controlled circuit controller connected to said axle and housed by the journal box, and circuit controlling mechanism influenced by the operation of said speed controller.

4. In a vehicle mechanism, the combination with an axle and journal box of the vehicle, of a circuit controller housed by the journal box, said circuit controller having a plurality of sections, one section connected to the axle and rotatable therewith and the other section mounted within a journal carried by the first section.

5. In a vehicle mechanism, the combination with an axle and journal box of the vehicle, of a circuit controller housed by the journal box and comprising a first section connected to and carried by for rotation with the axle and a second section adapted to be held stationary during the rotation of the axle and the first section, the said second section being mounted on the first section and within a journal carried by the first section.

6. In a vehicle mechanism, the combination with an axle and journal box of the vehicle, of a circuit controller housed by the journal box and comprising a first section connected to for rotation with the axle and a second section supported on said first section adjacent the axis thereof and adapted to be held stationary during the rotation of the axle and the first section.

7. In a vehicle mechanism, the combination with an axle and joural box of the vehicle, of a speed controlled circuit controller housed by the journal box and comprising a first section fixed to the axle and carried thereby for rotation therewith, and a second section supportingly carried by said first section localized adjacent the axis thereof and adapted to be held stationary during rotation of the axle and the said first section.

8. In a vehicle mechanism, the combination with an axle and journal box of the vehicle, of a speed controlled circuit controller housed by the journal box and comprising a first section attached to for bodily rotation with the axle, a second section adapted to be held stationary during the rotation of the axle, and bearing means localized at the axes of the axles and said sections and supporting the said second section on the first section.

9. In a vehicle mechanism, the combination with an axle and journal box of the vehicle, of a speed controlled circuit controller housed by the journal box and comprising a first section connected to for rotation with the axle, a second section adapted to be held stationary during the rotation of the axle and the first section and centrifugally operated means operable by the rotation of the axle and the first section relatively to the second section for controlling the movement of the vehicle.

10. In a vehicle mechanism, the combination with an axle and journal box of the vehicle, of a circuit controller housed by the journal box and comprising a first section attached to the axle, a second section and antifrictional bearing means supporting the second section on, within and adjacent the axis of the first section to permit rotation of the first section relatively to the said second section.

11. In a vehicle mechanism, the combination with an axle and journal box of the vehicle, of a speed controlled circuit controller connected to and carried by said axle and housed by the journal box, and circuit controlling contact means influenced by the operation of said controller to be opened at a predetermined speed.

12. In a vehicle mechanism, the combination with an axle and journal box of the vehicle, of a speed controlled circuit controller housed by the journal box and comprising a first casing section fixed to the axle and carried thereby for rotation therewith; a second casing section adapted to be held stationary during rotation of the axle and the said first section, said second casing section being mounted on, within and adjacent the axis of the first casing section, and means carried by and housed in said casing sections operated by the relative rotation of the sections for controlling the movement of the vehicle.

13. In a vehicle mechanism, the combination with an axle and journal box of the vehicle, of a speed controlled circuit controller housed by the journal box and comprising a first section attached to the axle, a second section, bearing means located at the axis of the sections supporting the second section on the first section to permit rotation of the first section relatively to the said second section, and means operable by the relative rotation of said sections for controlling the movement of the vehicle, both of said sections forming an enclosure for said means.

14. In a vehicle mechanism, the combination with an axle and journal box of the vehicle, of a circuit controller housed by the journal box and comprising a first section attached to the axle, a second section axially alined with the first section and bearing means supporting the second section on and within the outside wall of the first section to permit rotation of the first section relatively to the said second section, and means operable by the relative rotation of said sections for controlling the movement of the vehicle.

15. In a vehicle mechanism, the combination with an axle and journal box of the vehicle, the said journal box having an end closure, of a speed controlled circuit controller connected to the axle and arranged in said journal box between the end face of said axle and said end closure, the said speed controller including a section rotatable with the axle and a relatively stationary section, the said relatively stationary section having a part extending through the said closure.

16. In a vehicle mechanism, the combination with an axle and journal box of the vehicle, the said journal box having an end closure, of a speed controlled circuit controller connected to and carried by the axle and arranged in said journal box between the end face of said axle and said end closure, the said speed controller including a section rotatable with the axle and a relatively stationary section carried by the rotatable section, the said relatively stationary section having a part extending through the said closure.

17. In a vehicle mechanism, the combination with an axle and journal box of the vehicle, the said journal box having an end closure, of a speed controlled circuit controller connected to the axle and arranged in said journal box between the end face of said axle and said end closure, the said speed controller including a section provided with a pair of centrifugal arms rotatable with the axle and a relatively stationary section provided with circuit controlling means, the said relatively stationary section having a part extending through the said closure.

18. A speed controlled circuit controller comprising a section adapted for attachment to the outer end of the vehicle axle, centrifugal means carried by said section and a second section carried by said first section and adapted to be held stationary during rotation of said first section, the said second section being provided with electrical contact rings, and contact brushes carried by said centrifugal means cooperating with said contact rings.

19. A speed controlled circuit controller comprising a section adapted for attachment to the outer end of the vehicle axle, a pair of centrifugal arms carried by said section and a second section carried by said first section and adapted to be held stationary during rotation of said first section, the said second section being provided with a pair of contact rings, and contact brushes carried by said centrifugal means cooperating with said contact rings.

20. A speed controlled circuit controller comprising a section adapted for attachment to the outer end of the vehicle axle, centrifugal means carried by said section, a second section and bearing means on said first section for supporting said second section, the said second section being provided with contact rings, and contact brushes carried by said centrifugal means cooperating with said contact rings.

Signed at Chicago, in the county of Cook, and State of Illinois, this 30th day of August A. D. 1924.

ARCHIBALD G. SHAVER.